United States Patent [19]

Onuma et al.

[11] Patent Number: 4,499,158

[45] Date of Patent: Feb. 12, 1985

[54] WELDED STRUCTURAL MEMBER HAVING HIGH EROSION RESISTANCE

[75] Inventors: Tsutomu Onuma; Fumio Hataya, both of Hitachi, Japan

[73] Assignee: Hitachi, Ltd., Tokyo, Japan

[21] Appl. No.: 466,481

[22] Filed: Feb. 15, 1983

Related U.S. Application Data

[63] Continuation-in-part of Ser. No. 240,557, Mar. 4, 1981, abandoned.

[30] Foreign Application Priority Data

Mar. 5, 1980 [JP] Japan ................................. 55-26697

[51] Int. Cl.³ .............................................. B32B 15/00
[52] U.S. Cl. .................................... 428/682; 428/683; 428/684; 428/685; 416/241 R; 415/200; 415/212 A; 415/214; 75/128 A; 75/128 B
[58] Field of Search .......... 75/128; 428/656, 673–685; 415/200, 214, 212 A; 416/241 R

[56] References Cited

U.S. PATENT DOCUMENTS

| | | | |
|---|---|---|---|
| 3,764,303 | 10/1973 | Schmidt | 75/128 A |
| 4,165,245 | 8/1979 | Ludwig | 148/127 |

FOREIGN PATENT DOCUMENTS

| | | | |
|---|---|---|---|
| 483209 | 5/1952 | Canada | 75/128 A |
| 0039052 | 11/1981 | European Pat. Off. | 75/128 A |
| 0042180 | 12/1981 | European Pat. Off. | 75/128 A |
| 1394626 | 2/1965 | France | 75/128 A |
| 52-36511 | 3/1977 | Japan | 75/128 A |
| 54-15031 | 11/1979 | Japan | 75/128 A |
| 56-90958 | 7/1981 | Japan | 75/128 A |
| 56-12266 | 9/1981 | Japan. | |
| 668889 | 3/1952 | United Kingdom | 75/128 B |

OTHER PUBLICATIONS

Peckner, D. et al., *Handbook of Stainless Steels*, pp. 4–23, 26–6 to 26–9, (1979).
Chacour, S. A. et al., "Design Considerations for 1000 Meter Head, 500 Megawatt Single and Double Stage Reversible Pump/Turbine", ASEM Conference, pp. 17–28, (6/18/79).

*Primary Examiner*—L. Dewayne Rutledge
*Assistant Examiner*—Debbie Yee
*Attorney, Agent, or Firm*—Antonelli, Terry & Wands

[57] ABSTRACT

A welded structural member adapted to be subjected to a flowing fluid and comprising a base member consisting mainly of iron and a coating layer formed by a build-up welding on the surface of the base member, the coating layer having a higher erosion resistance than the base member. The coating layer contains 0.03 to 0.4 wt % of C, 0.1 to 1 wt % of Si, 0.5 to 20 wt % of Mn, 1 to 5.5 wt %, of Ni, 1 to 12 wt % of Co, 8 to 23 wt % of Cr and the balance Fe. The structure of the coating layer is mainly unstable austenite.

4 Claims, 7 Drawing Figures

WELDED STRUCTURAL MEMBER HAVING HIGH EROSION RESISTANCE

REFERENCE TO RELATED INVENTION

This application is a continuation-in-part of applicants' copending application Ser. No. 240,557, filed Mar. 4, 1981, and now abandoned.

BACKGROUND OF THE INVENTION

The present invention relates to a welded structural member having a high erosion resistance and, more particularly, to a coating layer formed by build-up welding on the surface of a structural member placed in a flowing fluid, particularly in water flowing at a high flowing velocity, in order to protect the member from erosion caused by a cavitation.

Typical examples of these structural members subjected to erosion are the runners of water turbines for generating electric power, runners of water pumps, ship propellers and so forth. In order to protect such a structural member against the erosion, it is desirable to form the structural member from a material having a high erosion resistance. However, if the whole part of the structural member is formed from such a material having a high erosion resistance, the production cost will be raised uneconomically. To avoid the increase in production cost, it has been proposed to form a protecting layer by a build-up welding on the surface of the structural member.

Stellite is known as one of the materials having a high erosion resistance and suitable for use as a material of build-up welding. In the build-up welding with stellite, however, it is necessary to preheat the material to be built-up up to 200° to 500° C. in order to prevent cracking in the deposited metal, because the stellite is rich in Co, Cr, W and C. The preheating of the material to such a high temperature causes a distortion of the structural member and brings about a high residual tensile stress in the structural member. In addition, the welding work is difficult to conduct in a narrow portion, resulting in a deteriorated weld zone. To avoid this difficulty, it has been proposed to use austenitic stainless steel rods having a high weldability. The austenitic stainless steel, however, has very low erosion resistance as compared with stellite and, therefore, cannot function as an erosion resistant material.

In view of a current tendency that the hydraulic apparatuses are required to operate under more severe condition of use for achieving higher performance, there is an increasing demand for welding material which will facilitate the welding in a narrow portion and which has a sufficiently high erosion resistance.

SUMMARY OF THE INVENTION

Accordingly, an object of the invention is to provide a structural member having a coating layer formed by a build-up welding with a material having a good weldability and erosion resistance.

To this end, according to the invention, the coating layer has a composition which contains, in its broadest aspect, 0.03 to 0.4 wt% of C, 0.1 to 1 wt% of Si, 0.5 to 20 wt% of Mn, 1 to 5.5 wt% of Ni, 1 to 12 wt% of Co, 8 to 23 wt% of Cr and the balance Fe, and the structure thereof consists mainly of unstable austenite. This composition will be referred to as the composition of "category I". The coating layer may contain, in addition to the constituents mentioned above, up to 1.2 wt% of an element having a high carbide forming power, such as Mo, V, W and Nb.

The alloy composition of the category I is selected to have mainly austenite structure, in order that the coating layer has a high weldability.

The austenite phase may contain, depending on alloy composition, 5% or less of ferrite or martensite phase. The ferrite phase content is preferably selected to be not greater than 3%, because it lowers the erosion resistance although it improves the weldability. To the contrary, the presence of martensite improves the erosion resistance but lowers the weldability. The martensite phase content, therefore, is selected to be 3% or less. Most preferably, needless to say, the whole structure consists of austenite.

The carbon, which is essential as the austenite former, has to be contained by at least 0.03 wt%. A carbon content exceeding 0.4 wt%, however, is not preferred because such a high carbon content hardens the steel and reduces the ductility resulting in a deteriorated weldability to permit an easy cracking undesirably. Further, in the solidification process, the excessive carbon permits precipitation of eutectic carbides with Cr and Fe to reduce the ductility and to adversely affect the corrosion resistance. Therefore, the carbon content should be selected to be not greater than 0.4 wt%.

Si is contained to effect a deoxidation during the welding. The Si content should be selected to be higher than 0.1 wt%, because a lower Si content cannot provide sufficiently high deoxidation effect. To the contrary, Si content in excess of 1 wt% will reduce the toughness of the steel.

Mn is an important austenite former in the invention. An unstable austenite structure, which induces formation of martensite by working, mainly consisting of Mn has a high work hardenability when subjected to the repeated impulsive working by cavitation and, accordingly, provides a higher erosion resistance. Therefore, it is necessary that the total content of Mn and other austenite formers be large enough to form the austenite structure. In the coating layer of the invention, the Mn content should be 0.5 wt% or higher, because Mn content less than 0.5 wt% promotes the formation of martensite in the steel to undesirably deteriorate the weldability. Mn content in excess of 20 wt%, however, is not preferred because it promotes the formation of stable austenite.

Ni has an austenite forming effect which is twice as high as that of Mn. An addition of Ni in excess of 5.5 wt%, however, undesirably reduces the work hardenability and erosion resistance. On the other hand, Ni content less than 1 wt% increases martensite structure, to make the structure brittle and less resistant to erosion. An addition of 1 to 5.5 wt% of nickel is essential to ensure a sufficient erosion resistance and weldability.

Co is also an austenite former, but its austenite forming power is as small as about ⅓ of that of Ni, which is even smaller than that of Mn. An addition of Co, however, strengthens the austenite structure to improve the erosion resistance and, particularly, to reduce the erosion weight loss over a long period of time. The Co content should be selected to fall between 1 and 12 wt%, because the above-explained effect is insufficient with the Co content of less than 1 wt%, whereas the Co content in excess of 12 wt% lowers the weldability although the erosion weight loss is decreased.

In order to maintain a sufficient corrosion resistance, the Cr content is preferably 8 wt% or greater and, more preferably, 12 wt% or grater. Cr content exceeding 23 wt%, however, is not preferred because of an excessive formation of ferrite which lowers the erosion resistance and makes the structure brittle.

Mo, V, W, Nb and so forth, as the metals having higher carbide forming power than Cr, are ferrite formers. Therefore, if Mo, V, W, Nb or the like is contained in excess of 1.2 wt%, the formation of ferrite structure is promoted unnecessarily to lower the erosion resistance. However, an addition of such elements by an appropriate amount effectively prevents the formation of the Cr-carbides, not only to strengthen the austenite grain boundary but also to form wear resistant particles in the austenite matrix to ensure a higher erosion resistance.

The steel as the material of the coating layer in accordance with the invention inevitably contains P and S as impurities, as well as Al, Zr, Ti, and rare earth elements which are contained as deoxidizers in the coated arc welding rod. The P and S contents preferably should be below 0.03 wt% while Al, Zr, Ti, and rare earth elements should be contained preferably by an amount less than 0.1 wt%. Particularly, the S content is selected to be 0.01 wt% or less, because S reacts with Mn, of which content being high in the invention, to form MNS inclusions.

The coating layer should have a value of 6–18 in Ni equivalent. When the Ni equivalent is less than 6 or greater than 18, it is impossible to reduce the erosion weight loss to less than 4 mg/cm²/2h. The Ni equivalent is obtained by the following formula:

$$\text{Ni equivalent} = 30 \times C(wt\%) + \tfrac{1}{2} \times Mn(wt\%) + Ni(wt\%) + \tfrac{1}{3} \times Co(wt\%).$$

Further, according to the invention the coating layer should have a region, in the relationship between Mn content and Co/Ni ratio, surrounded by the following points A–G in FIG. 1:

A(Mn=0.5 wt%, Co/Ni=1.25),
B(Mn=3 wt%, Co/Ni=0.5),
C(Mn=12 wt%, Co/Ni=0.5),
D(Mn=20 wt%, Co/Ni=2.5),
E(Mn=20 wt%, Co/Ni=5.5),
F(Mn=5 wt%, Co/Ni=5.5) and
G(Mn=0.5 wt%, Co/Ni=1.5).

When the coating layer having the alloy composition of "category I" heretofore described is formed by the build-up welding, it is preferable that the structure thereof consists mainly of unstable austenite but contains less than 5% of at least one of martensite and ferrite.

On the other hand, if it is desired that the structure consists mainly of austenite and contains less than 5% of ferrite so as not to contain martensite, the composition is selected to contain 0.1 to 0.4 wt% of C, 0.1 to 1 wt% of Si, 0.5 to 7 wt% of Mn, 1 to 5.5 wt% of Ni, 2 to 12 wt% of Co, 16 to 23 wt% of Cr and the balance Fe and to have a value of 6–18 in the aforesaid Ni equivalent. This composition will be referred to as the composition of "category II".

It will be seen that, in the composition of category II, the higher part of the C content in the composition range of category I is selected. Also, the lower part of the Mn content in the composition range of category I is selected to improve the weldability. Furthermore, higher parts of Co and Cr contents in the composition range of category I are selected to harden the matrix. That alloy composition of category II results in an improved weldability.

Further, if it is desired that the structure consists mainly of austenite and contains less than 5% of martensite so as not to contain ferrite, the composition is selected to contain 0.03 to 0.2 wt% of C, 0.1 to 1 wt% of Si, 8 to 14 wt% of Mn, 1 to 5.5 wt% of Ni, 1 to 8 wt% of Co, 10 to 18 wt% of Cr and balance Fe and to have a value of 6–18 in the aforesaid Ni equivalent. This composition will be referred to as composition of "category III". In the composition of the category III, the lower part of C content in the composition range of category I is selected to enhance the weldability. Also, a higher part of Mn content than that of category II is selected to obtain a high work hardenability. On the other hand, the Co and Cr contents are selected to be lower than those of the category II. The composition of the category III results in an improved erosion resistance.

In addition, same as in the case of the alloy composition of the category I, the compositions of the categories II and III may include elements such as Mo, V, W and Nb by an amount up to 1.2%.

The build-up welding is conducted in three or more layers and the welded layers may be subjected to a stress relief treatment, but the "as-welded" condition is preferred.

The structure of the coating layer formed by the build-up welding can be controlled in accordance with he Schaeffler's diagram.

The Cr equivalent is obtained by the following formula:

$$\text{Cr equivalent} = Cr(wt\%) + Mo(wt\%) + 1.5 \times Si(wt\%) + \tfrac{1}{2} \times Nb(wt\%).$$

DESCRIPTION OF THE PREFERRED EMBODIMENTS

Example 1

Figure 1:
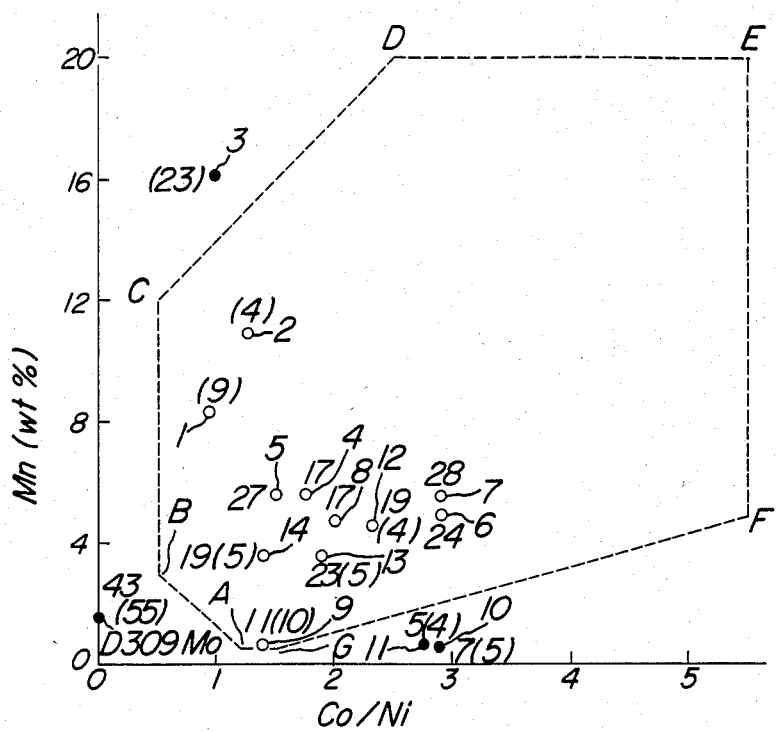
FIG. 1 is a graph showing the relationship between the Mn content and the Co/Ni ratio.

Table 1 shows the chemical composition (wt%) and erosion weight loss of the coating layer of the invention formed by build-up welding (Nos. 1 and 2) and those of the comparative one (No. 3) and the conventional ones (D 309 Mo and stellite). The samples Nos. 1 and 2 belong to the composition of the category III, while the sample No. 3 corresponds to the composition of comparative material.

The coating layers of samples Nos. 1 to 3 are formed by build-up welding conducted with a coated arc welding rod which is produced by coating a core wire of 13% Cr with a coating material incorporating a flux of lime-titania system, and, for an adjustment of content, mixing powders of C, Si, Mn, Ni, Co and Mo with the flux. The conventional coating layers are formed by a build-up welding which is carried out with a commercially available austenitic stainless steel welding rod (JIS D 309 Mo) and a welding rod of stellite system which is a Co-based alloy. A casting of 13% Cr steel was used as the material to be coated. On the surface of this material, build-up welding by arc was effected in three layers, under the welding condition of welding current 150 A, welding voltage 23 V and heat input 16 KJ/cm. The diameter of the welding rod used was 4 mm. The thickness of each layer was about 3 mm. The dilution ratios of the first, second and third layers to the base metal were about 30%, about 10% and 0%, respectively. The chemical composition shown in Table 1 is that of the third layer. In order to adjust the composition of the coating layer, it is necessary to determine the composition of the welding rod taking into account the number of layers and the dilution ratios.

The erosion test was conducted by magnetostriction vibration method. Namely, after leaving the samples for two hours in stationary water while applying a vibration at a frequency of 6.5 KHz and amplitude of 120 $\mu$m, the weight loss was measured to determine the erosion weight loss. In this test, test pieces of 22 mm dia. obtained from the sample in as-welded condition were used. The test pieces of the coating layer of the invention are wholly austenite, with slight precipitation of Cr-carbides in the vicinity of the grain boundary.

alloy. Thus, the sample No. 2 showed an excellent erosion resistance.

Incidentally, the final layer of the coating layer of the sample No. 2 showed a Vickers hardness Hv of 230 to 260, tensile strength of 80 to 90 Kgf/mm$^2$, 0.2% proof stress of 50 to 60 Kgf/mm$^2$, and elongation of 15 to 20%. The structure of each of the first to third layers in each of samples Nos. 1 to 3 was almost wholly austenitic.

A C-form restraint about welding cracking test (FISCO Cracking Test) as determined in JIS Z 3155 was conducted using a coated arc welding rod as used in the formation of the sample No. 2. As the material to be coated, a steel plate of a steel containing 13% Cr (SUS 410) of 12 mm thickness was used. The welding was conducted under the same condition as that stated before, with an I bevel and a root gap of 3 mm. The cracking ratio determined by l/L $\times$ 100, where l and L represent hot cracking length and welding length, respectively, was about 13%, which is substantially equivalent to the cracking ratio (10%) in the coating layer formed with D 309 Mo under the same welding condition. Thus, it was confirmed that the coating layer of the invention possesses an excellent welding performance.

Example 2

This example relates to the composition belonging to the category II.

Table 2 shows the chemical compositions of deposited metals formed in the same way as Example 1 and percent elongations at failure measured through a tension test of these deposited metal, together with the results of the erosion test conducted for 10 hours in

TABLE 1

| Sample No. | Chemical composition (wt. %) | | | | | | | | | | | Erosion weight loss (mg/2h) |
|---|---|---|---|---|---|---|---|---|---|---|---|---|
| | C | Si | Mn | P | S | Ni | Co | Cr | Mo | W | Fe | |
| No. 1* | 0.03 | 0.15 | 8.30 | 0.023 | 0.011 | 2.30 | 2.15 | 13.29 | 0.16 | — | Bal. | 7–10 |
| No. 2* | 0.07 | 0.27 | 10.85 | 0.025 | 0.009 | 3.56 | 4.50 | 14.35 | 0.20 | — | " | 3–5 |
| No. 3** | 0.15 | 0.57 | 16.07 | 0.021 | 0.010 | 5.70 | 5.50 | 15.47 | 0.90 | — | " | 20–25 |
| D 309 Mo | 0.09 | 0.44 | 1.53 | 0.020 | 0.015 | 12.30 | — | 22.74 | 2.30 | — | " | 50–60 |
| Stellite | 0.78 | 1.09 | 1.51 | 0.003 | 0.007 | — | Bal. | 29.20 | — | 3.8 | — | 1–3 |

*composition of category III
**composition of comparative material

As will be understood from Table 1, the samples Nos. 1 and 2 of the invention showed smaller erosion weight loss than those of the samples formed by the comparative material (No. 3) and the conventional austenitic stainless steel D 309 Mo. Particularly, the sample No. 2 showed an erosion weight loss which is substantially equivalent to that of the stellite which is a Co-based accordance with the magnetostriction vibration method under the same condition as Example 1. The test pieces were in the as-welded condition. The test pieces of the deposited metal in accordance with the invention were wholly formed of austenite structure with a slight precipitation of Cr-carbides in the vicinity of the grain boundary.

TABLE 2

| | Sample No. | Chemical composition (wt. %) | | | | | | | | | | | Elongation (%) | Erosion weight loss (mg/10h) |
|---|---|---|---|---|---|---|---|---|---|---|---|---|---|---|
| | | C | Si | Mn | P | S | Ni | Co | Cr | V | Mo | Fe | | |
| Materials of invention | No. 4 | 0.16 | 0.45 | 5.62 | 0.026 | 0.008 | 3.30 | 5.75 | 19.87 | 0.40 | — | Bal. | 17.1 | 87.2 |
| | No. 5 | 0.23 | 0.43 | 5.59 | 0.025 | 0.009 | 3.78 | 5.70 | 20.10 | 0.84 | — | Bal. | 26.6 | 95.0 |
| | No. 6 | 0.27 | 0.45 | 4.96 | 0.023 | 0.009 | 3.03 | 8.76 | 20.15 | 0.65 | — | Bal. | 23.8 | 65.0 |
| | No. 7 | 0.23 | 0.46 | 5.50 | 0.016 | 0.006 | 2.99 | 8.69 | 18.65 | 0.44 | 1.15 | Bal. | 27.8 | 60.6 |
| | No. 8 | 0.19 | 0.51 | 4.67 | 0.022 | 0.009 | 2.91 | 5.80 | 19.14 | — | — | Bal. | 17.0 | 92.0 |
| Comparative material | D 309 Mo | 0.07 | 0.44 | 1.53 | 0.018 | 0.012 | 12.30 | — | 21.70 | — | 2.20 | Bal. | 43.0 | 120.0 |
| | Co-based alloy | 0.21 | 0.70 | 0.51 | 0.007 | 0.003 | 2.52 | Bal. | 24.48 | — | 5.84 | 2.95 | 6.5 | 75.0 |

TABLE 2-continued

| Sample | Chemical composition (wt. %) | | | | | | | | | | Elongation | Erosion weight loss |
| No. | C | Si | Mn | P | S | Ni | Co | Cr | V | Mo | Fe | (%) | (mg/10h) |
|---|---|---|---|---|---|---|---|---|---|---|---|---|---|
| rials | | | | | | | | | | | | | |

In Table 2, samples Nos. 4 to 7 are the deposited metals in accordance with the invention, in which V is added especially. The sample No. 8 has major components similar to those of the samples of the invention but does not contain V. Comparing the samples Nos. 4 to 7 with the sample No. 8, the former exhibit distinguished elongation over the latter. The addition of V is effective in refining the grains in the structure of the deposited metal to provide an increased ductility. In the sample No. 7, Mo is added besides V. Thanks to the addition of Mo, the sample No. 7 exhibits a smaller erosion weight loss, i.e. improved erosion resistance as compared with the samples Nos. 4 to 6.

The present inventors have confirmed that, in order to avoid the weld crack when a build-up welding is effected in three or more layers over an area of 0.3 m² or greater, the elongation of the deposited metal should be greater than 10% and that an especially strict control and management are necessary in effecting the welding, if the elongation is less than 10%. The conventional D 309 Mo material can satisfy this requirement concerning the elongation but cannot provide sufficiently high erosion resistance. It is also to be pointed out that the Co-based alloy often causes the weld to crack when effecting the multi-layered build-up welding.

Thus, if the coating layer having the composition belonging to the category II is formed by a build-up welding, it exhibits a superior ductility, weld crack resistance and erosion resistance.

Example 3

In this case, alloy materials belonging to the category II but containing no Mo, V and so forth are compared with materials having small Mn content.

Alloy layers of the compositions shown in Table 3 were formed in the same way as Example 1. The test pieces were in the as-welded condition.

TABLE 3

| | Sample No. | Chemical composition (wt. %) | | | | | | | |
|---|---|---|---|---|---|---|---|---|---|
| | | C | Si | Mn | P | S | Ni | Co | Cr | Fe |
| Material of invention | No. 9 | 0.23 | 0.47 | 0.62 | 0.023 | 0.010 | 5.18 | 7.26 | 19.58 | Bal. |
| Comparative materials | No. 10 | 0.25 | 0.40 | 0.50 | 0.018 | 0.009 | 2.31 | 6.72 | 17.67 | Bal. |
| | No. 11 | 0.36 | 0.42 | 0.58 | 0.021 | 0.014 | 2.34 | 6.48 | 17.80 | Bal. |
| Materials of invention | No. 12 | 0.18 | 0.50 | 4.62 | 0.003 | 0.012 | 2.91 | 6.78 | 19.83 | Bal. |
| | No. 13 | 0.20 | 0.64 | 3.62 | 0.003 | 0.014 | 3.12 | 5.91 | 18.99 | Bal. |
| | No. 14 | 0.23 | 0.62 | 3.56 | 0.003 | 0.012 | 3.08 | 4.38 | 18.97 | Bal. |

In Table 3, samples Nos. 10 and 11 are comparative materials which are steels containing 0.25 to 0.36 wt% of C, about 18 wt% of Cr, about 2 wt% of Ni and about 6.5 wt% of Co. The Mn contents thereof are as low as about 0.5%. In contrast, the coating layers of the invention listed as samples Nos. 9 and 12 to 14 have higher Mn content than the comparative materials, i.e. sample Nos. 10 and 11. With these materials, a tension test was conducted to investigate mechanical properties, as well as a magnetostriction vibration cavitation test to investigate the erosion weight loss, the results of which are shown in Table 4. The test pieces of materials in accordance with the invention were wholly formed of austenite structure with a slight precipitation of Cr-carbides in the vicinity of the grain boundary.

TABLE 4

| | Sample No. | Tensile strength (kgf/mm²) | 0.2% Proof stress (kgf/mm²) | Elongation (%) | Reduction in area (%) | Erosion weight loss (mg/2h) |
|---|---|---|---|---|---|---|
| Material of invention | No. 9 | 69.9 | 47.6 | 10.9 | 13.3 | 9.9 |
| Comparative materials | No. 10 | 66.3 | 48.1 | 7.2 | 9.0 | 4.7 |
| | No. 11 | 61.0 | 50.1 | 4.6 | 7.1 | 4.2 |
| Materials of invention | No. 12 | 75.1 | 42.0 | 19.0 | 21.0 | 3.9 |
| | No. 13 | 88.3 | 32.2 | 23.2 | 13.4 | 4.5 |
| | No. 14 | 75.5 | 35.5 | 18.8 | 15.3 | 4.9 |

The sample No. 11 is rather brittle due to small Ni content, although thanks to high C content it has austenite structure. The elongation as an index of ductility as well as the reduction in area are lowered accordingly. The reduced ductility may induce the cracking on carrying out the welding. In order to avoid such a cracking, it is necessary to increase the ductility by making it austenite structure containing Mn and Ni.

As may be apparent from Table 4, the sample No. 9 exhibits an elongation of about 11% which is large enough to avoid the weld crack. This sample, however, exhibits a value of about 10 mg in erosion weight loss and it is considered that this value is sufficiently smaller than the value in erosion weight loss exhibited by the conventional D 309 Mo material but is insufficient for the material of the equipments subjected to vigorous cavitation. The erosion weight loss is preferably 5 mg or smaller, 5 mg corresponds to a weight loss per unit area of 1.3 mg/cm²/2h.

In samples Nos. 10 and 11, the erosion weight loss is decreased to an order of 4.2 to 4.7 mg. This decrease in the erosion weight loss, however, is accompanied by a reduction in elongation down to 4.6 to 7.2%, thereby making it subject to weld crack. In order to practically prevent the weld crack, an elongation of more than 10% is desirable.

The samples Nos. 12 to 14 of the invention are intended for reducing the erosion weight loss of the comparative material samples Nos. 10 and 11, without reducing the elongation of the latter. It will be seen that, in the samples Nos. 12 to 14, the erosion weight loss is reduced down to 3.9 to 4.9, while preserving the large elongation of about 19 to 23%. As to the 0.2% proof stress in relation to tensile strength, the samples Nos. 12 to 14 of the present invention exhibit a proof stress ranging between 32.2 kgf/mm² and 42.0 kgf/mm² which is lower than that of the comparative material samples Nos. 10 and 11 ranging between 48.1 kgf/mm² and 50.1 kgf/mm². However, the samples in accordance with the invention have a tensile strength which is between 75.1 kgf/mm² and 88.3 kgf/mm². This tensile strength is higher than that of the comparative material samples Nos. 10 and 11 ranging between 61.0 kgf/mm² and 66.3 kgf/mm².

With respect to the alloys used in the aforesaid Examples 1 to 3, the relationships between the Mn content, Co content, Ni content and Ni equivalent, and the erosion weight loss and elongation were investigated.

FIG. 1 is a graph showing the relationship between the Mn content and the Co/Ni ratio. As shown in this Figure, the alloys have an elongation of greater than 10% and an excellent erosion resistance with a value in erosion weight loss of less than 15 mg/2h (4 mg/cm²/2h) within a region surrounded by the points A(Mn=0.5 wt%, Co/Ni=1.2), B(Mn=3 wt%, Co/Ni=0.5), C(Mn=12 wt%, Co/Ni=0.5), D(Mn=20 wt%, Co/Ni=2.5), E(Mn=20 wt%, Co/Ni=5.5), F(Mn=5 wt%, Co/Ni=5.5) and G(Mn=0.5 wt%, Co/Ni=1.5). In this Figure, the numeral with the leader line represents the sample No., the numeral within the parentheses represents the erosion weight loss (mg/2h) and the numeral without the parentheses represents the elongation (%).

Figure 2:
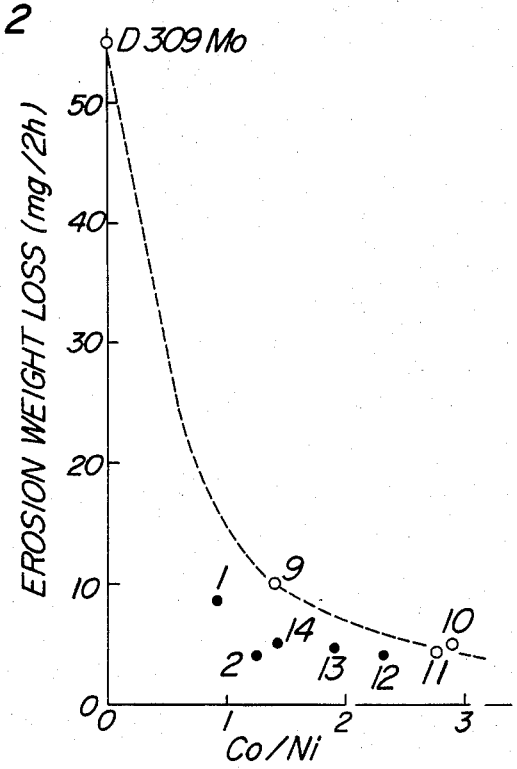
FIG. 2 is a graph showing the relationship between the erosion weight loss and the Co/Ni ratio.

FIG. 2 is a graph showing the relationship between the erosion weight loss and the Co/Ni ratio. As shown in this Figure, it will be seen that the erosion resistance is improved with increase in the Co/Ni ratio. In this Figure, the numeral represents the sample No., the mark (O) represents the alloy containing 0.5 to 1.5 wt% of Mn and the mark (●) represents the alloy containing 3.6 to 10.9 wt% of Mn.

Figure 3:
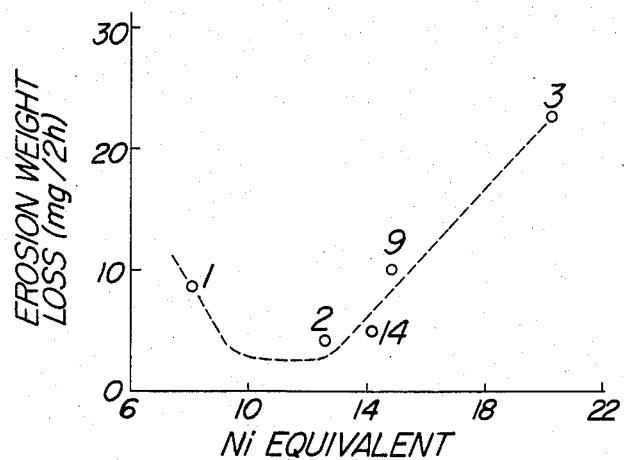
FIG. 3 is a graph showing the relationship between the erosion weight loss and the Ni equivalent.

FIG. 3 is a graph showing the relationsip between the erosion weight loss and the Ni equivalent. As shown in this Figure, it will be seen that when the Ni equivalent is in the range of 6-18 an excellent erosion resistance with a value in erosion weight loss of less than 15 mg/2h is obtained. In this Figure, the numeral represents the sample No. and the alloys having a value between 0.9 and 1.5 in the Co/Ni ratio are shown.

Figure 4:
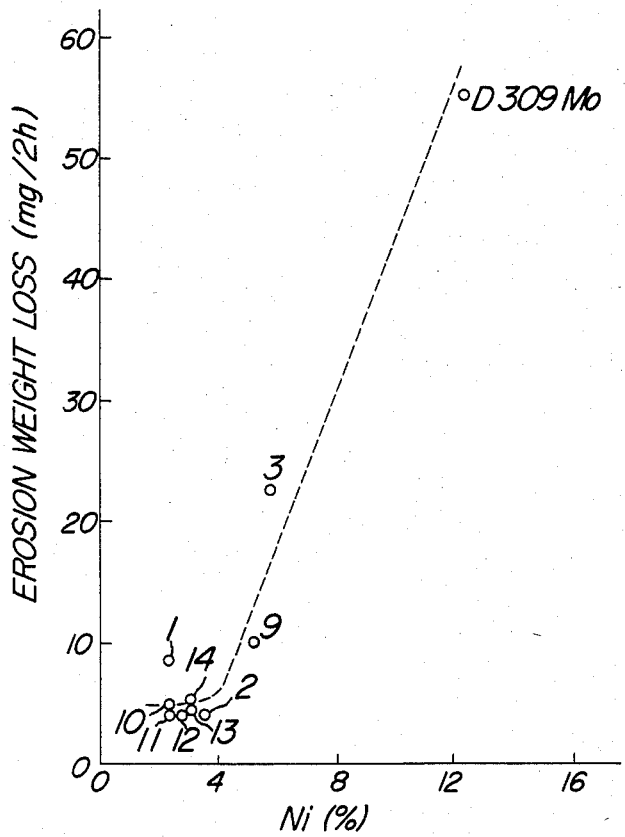
FIG. 4 is a graph showing the relationship between the erosion weight loss and the Ni content.

FIG. 4 is a graph showing the relationship between the erosion weight loss and the Ni content. As shown in this Figure, when the Ni content is less than 5.5 wt% an excellent erosion resistance with a value in erosion weight loss of less than 15 mg/2h is obtained. In this Figure, the numeral represents the sample No. and the alloys having a value between 8 and 20.3 in Ni equivalent are shown.

Figure 5:
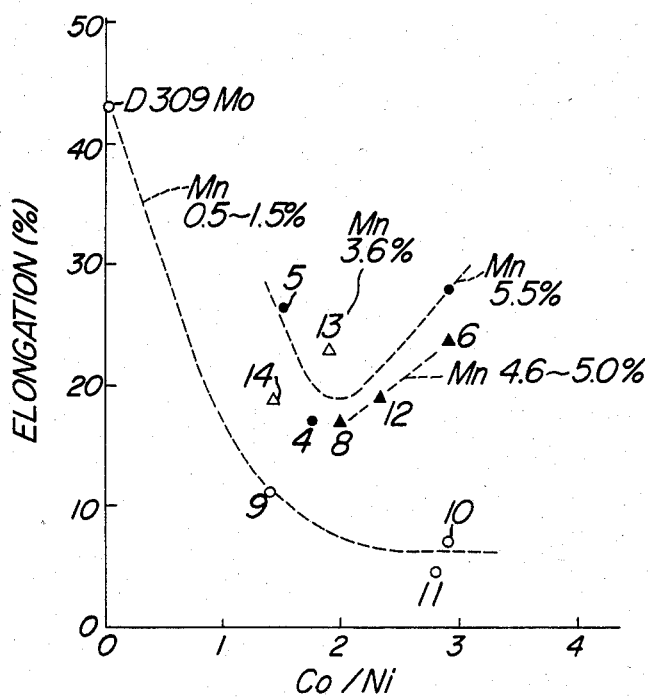
FIG. 5 is a graph showing the relationship between the elongation and the Co/Ni ratio.

FIG. 5 is a graph showing the relationship between the elongation and the Co/Ni ratio. As shown in this Figure, it will be seen that the elongation is lowered with increase in the Co/Ni ratio but is remarkedly improved by the addition of Mn. In this Figure, the numeral represents the sample No.

Example 4

Figure 6:
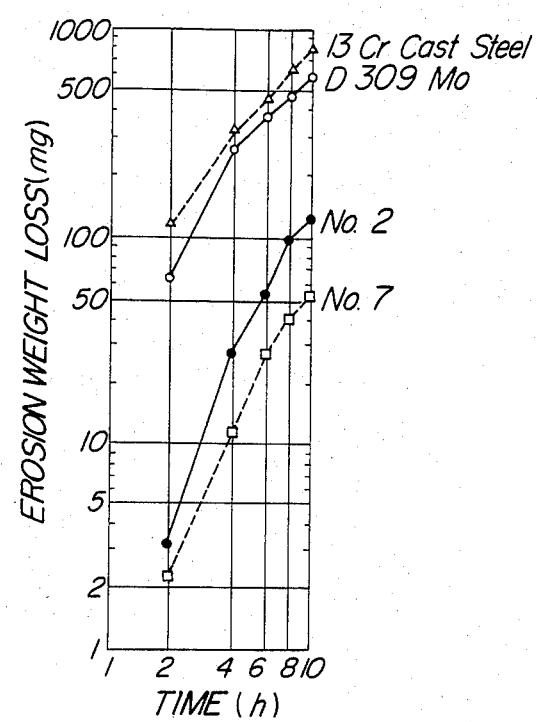
FIG. 6 is a graph showing the relationship between the erosion weight loss and the testing time.

In this case, the erosion resistance is shown as a function of time. FIG. 6 shows the result of an erosion test conducted with 4 (four) kinds of alloy materials. As in the case of Example 1, the test was conducted by magnetostriction vibration method, at a frequency of 6.5 KHz and an amplitude of 120 μm. The test solution was the city water of a temperature of 25° C. The test solution was renewed every two hours at each time of which the erosion weight loss was measured. In this test, the erosion weight loss is measured as the weight loss from the surfaces of test pieces of 22 mm dia.

The compositions of the sample Nos. 2 and 7 in FIG. 6 are shown in Tables 1 and 2. These are deposited metals formed by a build-up welding conducted with a coated arc welding rod of lime-titania system having a diameter of 4.0 mm. The welding was conducted in flat position under the condition of welding current 150 A, arc voltage 23 V and welding speed 15 to 20 cm/min. As will be seen from FIG. 6, the 13%Cr cast steel which is ordinarily used as the material of water wheel runners exhibits an erosion weight loss of about 120 mg in 2(two) hours. The erosion weight loss is increased to 800 mg after 10(ten) hours.

The D 309 Mo material generally used as the erosion resistant coating material exhibits an erosion weight loss of 65 mg and 600 mg in 2 and 10 hours, respectively. Thus, this known material exhibits higher erosion resistance than 13%Cr steel.

In contrast, as will be seen from FIG. 6, the coating layer of the invention, the examples of which are shown as samples Nos. 2 and 7, exhibits an extremely small erosion weight loss. Namely, the erosion weight loss is less than 4 mg in 2 hours in both of the samples Nos. 2 and 7. The erosion weight losses in 10 hours are less than 120 mg and less than 50 mg, respectively, in the samples Nos. 2 and 7.

It will be seen that the coating layer of the invention exhibits a superior erosion resistance.

Example 5

In this case, the coating layer of the invention is formed as a protecting layer on an actual runner by a build-up welding.

Figure 7:
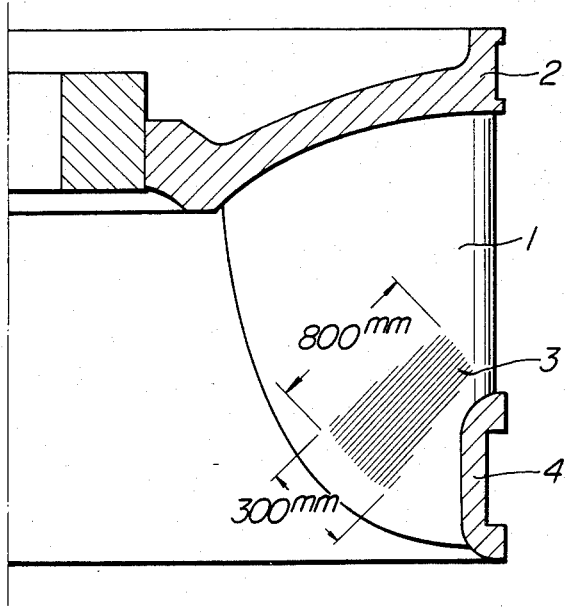
FIG. 7 is a sectional view of a Francis type runner.

Referring to FIG. 7 showing a Francis type runner in section, a reference numeral 1 denotes a runner vane, 2 denotes a crown and 4 denotes a band. The build-up welding was effected on the hatched area having a size shown in this Figure. The welding was conducted employing a coating welding rod of lime-titania system of 4.0 mm dia. in a 45° vertical position, under the welding condition of welding current 140 A D.C., arc voltage 23 V and welding speed of 15 to 20 cm/min. The deposited metal obtained as a result of the build-up welding had a chemical composition of C 0.28 wt%, Si 0.45 wt%, Mn 2.90 wt%, Ni 2.05 wt%, Co 6.50 wt%, Cr 19.80 wt% and Mo 0.95 wt%. Thus, this deposited metal has a composition belonging to the category II and containing additional Mo. The water wheel runner to be build-up welded, which is made of 13%Cr cast steel, was pre-heated up to 250° C. before the welding. The area over which the build-up welding is effected was beforehand machined to a depth of about 20 mm, and the build-up welding was conducted on the machined area in 6 layers. After the welding, the surface of the coating layer in as-welded condition was machined and finished perfectly into the form of vane. The finished surface was then checked by a dye flaw detection method for weld crack, but no crack was found in the coating layer. This runner was then put into actual running to investigate the erosion weight loss. The coating layer of the invention showed, on the basis of 8000 hours running, an erosion weight loss which is as small as 1/5 of that showed by the 13%Cr cast steel and ⅓ of that showed by the D 309 Mo material.

As has been described, the present invention provided a coating layer which is superior in both of erosion resistance and weldability. The coating layer can suitably be formed by a build-up welding, without any flaw or defect, on a water wheel runner or the like member which operates under a cavitating or eroding condition, to effectively protect such a member from erosion to ensure a longer life of the member.

What is claimed is:

1. A welded structural member adapted to be subjected to a flowing fluid, said welded structural member comprising a base member consisting mainly of iron and a coating layer formed by build-up welding on said base member, said coating layer having a higher erosion resistance than said base member, characterized in that said coating layer contains 0.1 to 0.4 wt% of C, 0.1 to 1 wt% of Si, 3.6 to 5.6 wt% of Mn, 1 to 5.5. wt% of Ni, 2 to 12 wt% of Co, 16 to 23 wt% of Cr and the balance Fe, and has a value of 6–18 in Ni equivalent given by the following equation:

$$\text{Ni equivalent} = 30 \times C(wt\%) + \tfrac{1}{2} \times Mn(wt\%) + Ni(wt\%) + \tfrac{1}{3} \times Co(wt\%),$$

a Co/Ni ratio of 1.4 to 2.9, and further has a mainly unstable austenite structure containing less than 5% of ferrite, a percent elongation at failure of greater than 10% at room temperature and an erosion weight loss of less than 1.3 mg/cm² in an erosion test conducted for 2 hours stationary water by a magnetostriction vibration method at a frequency of 6.5 KHz and an amplitude of 120 μm.

2. A welded structural member adapted to be subjected to a flowing fluid, said welded structural member comprising a base member consisting mainly of iron and a coating layer formed by build-up welding on said base member, said coating layer having a higher erosion resistance than said base member, characterized in that said coating layer contains 0.1 to 0.4 wt% of C, 0.1 to 1 wt% of Si, 3.6 to 5.6 wt% of Mn, 1 to 5.5 wt% of Ni, 2 to 12 wt% of Co, 16 to 23 wt% of Cr, each less than 1.2 wt% of one or two of Mo, V, W and Nb, and the balance Fe, and has a value of 6–18 in Ni equivalent given by the following equation:

$$\text{Ni equivalent} = 30 \times C(wt\%) + \tfrac{1}{2} \times Mn(wt\%) + Ni(wt\%) + \tfrac{1}{3} + Co(wt\%),$$

a Co/Ni ratio of 1.4 to 2.9, and further has a mainly unstable austenite structure containing less than 5% of ferrite, a percent elongation at failure of greater than 10% at room temperature and an erosion weight loss of less than 1.3 mg/cm² in an erosion test conducted for 2 hours in stationary water by a magnetostriction vibration method at a frequency of 6.5 KHz and an amplitude of 120 μm.

3. A water wheel runner having a coating layer formed by a build-up welding on the body of said runner, characterized in that said coating layer contains 0.1 to 0.4 wt% of C, 0.1 to 1 wt% of Si, 3.6 to 5.6 wt% of Mn, 1 to 5.5 wt% of Ni, 2 to 12 wt% of Co, 16 to 23 wt% of Cr and the balance Fe, and has a value of 6–18 in Ni equivalent given by the following equation:

$$\text{Ni equivalent} = 30 \times C(wt\%) + \tfrac{1}{2} \times Mn(wt\%) + Ni(wt\%) + \tfrac{1}{3} \times Co(wt\%),$$

a Co/Ni ratio of 1.4 to 2.9 and further has a mainly unstable austenite structure containing less than 5% of ferrite, a percent elongation at failure of greater than 10% at room temperature and an erosion weight loss of less than 1.3 mg/cm² in an erosion test conducted for 2 hours in stationary water by a magnetostriction vibration method at a frequency of 6.5 KHz and an amplitude of 120 μm.

4. A pump runner having a coating layer formed by a build-up welding on the body of said runner, characterized in that said coating layer contains 0.1 to 0.4 wt% of C, 0.1 to 1 wt% of Si, 3.6 to 5.6 wt% of Mn, 1 to 5.5 wt% of Ni, 2 to 12 Wt% of Co, 16 to 23 wt% of Cr and the balance Fe, and has a value of 6–18 in Ni equivalent given by the following equation:

$$\text{Ni equivalent} = 30 \times C(wt\%) + \tfrac{1}{2} \times Mn(wt\%) + Ni(wt\%) + \tfrac{1}{3} \times Co(wt\%),$$

a Co/Ni ratio of 1.4 to 2.9, and further has a mainly unstable austenite structure containing less than 5% of ferrite, a percent elongation at failure of greater than 10% at room temperature and an erosion weight loss of less than 1.3 mg/cm² in an erosion test conducted for 2 hours in stationary water by a magnetostriction vibration method at a frequency of 6.5 KHz and an amplitude of 120 μm.

* * * * *